US008144565B2

(12) United States Patent
Kawamura et al.

(10) Patent No.: US 8,144,565 B2
(45) Date of Patent: Mar. 27, 2012

(54) OPTICAL HEAD AND APPARATUS USING THE SAME (75) Inventors: Tomoto Kawamura, Yokohama (JP); Hiroshi Ogasawara, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 379 days.

(21) Appl. No.: 12/359,440

(22) Filed: Jan. 26, 2009

(65) Prior Publication Data
US 2009/0190460 A1 Jul. 30, 2009

(30) Foreign Application Priority Data

Jan. 28, 2008 (JP) .................................. 2008-015745

(51) Int. Cl.
*G11B 7/00* (2006.01)

(52) U.S. Cl. .......... 369/112.16; 369/112.23; 369/112.01

(58) Field of Classification Search .............. 369/112.16
See application file for complete search history.

(56) References Cited

U.S. PATENT DOCUMENTS

| | | | |
|---|---|---|---|
| 5,513,164 A * | 4/1996 | Tanaka et al. ................. 369/53.2 |
| 6,181,666 B1 * | 1/2001 | Miyazaki et al. .......... 369/112.01 |
| 6,185,167 B1 | 2/2001 | Arai et al. |
| 6,222,812 B1 * | 4/2001 | Yoo et al. .................. 369/112.16 |
| 7,016,290 B2 * | 3/2006 | Nakano et al. ............ 369/110.04 |
| 7,180,845 B2 * | 2/2007 | Ohyama .................... 369/112.16 |
| 2002/0181373 A1 | 12/2002 | Takeda et al. |
| 2005/0007932 A1 | 1/2005 | Ishika |
| 2007/0104072 A1 | 5/2007 | Ogata |
| 2008/0247298 A1 * | 10/2008 | Ogata ....................... 369/112.23 |

FOREIGN PATENT DOCUMENTS

| | | |
|---|---|---|
| CN | 1577524 | 2/2005 |
| CN | 1957404 | 5/2007 |
| JP | 01-282753 | 11/1989 |
| JP | 04-028028 | 2/1992 |
| JP | 08-185640 | 7/1996 |
| JP | 11-73658 | 3/1999 |
| JP | 2000-21012 | 1/2000 |
| JP | 2003-248955 | 9/2003 |
| JP | 2005-292766 | 10/2005 |
| JP | 2006-099933 | 4/2006 |
| JP | 2006-344344 | 12/2006 |
| JP | 2007-133918 | 5/2007 |
| JP | 2008-004135 | 1/2008 |

* cited by examiner

*Primary Examiner* — Van Chow
(74) *Attorney, Agent, or Firm* — Antonelli, Terry, Stout & Kraus, LLP.

(57) ABSTRACT

An optical head and an apparatus using the optical head are shown. The optical head includes a light-emitting element, a first polarized light diverging element for transmitting the light beam of a first polarization direction and reflecting the light beam of a second polarization direction orthogonal to the first polarization direction, a second polarized light diverging element for transmitting or reflecting the light beam of the first polarization direction, a converging element for converging the light beam on an information recording medium, a reflection element for reflecting a first reflected light beam reflected on the information recording medium and reflected on or transmitted through the second polarized light diverging element, and a detection element for detecting a second reflected light beam reflected on the reflection element and transmitted through or reflected on the second polarized light diverging element.

12 Claims, 12 Drawing Sheets

OPTICAL HEAD AND APPARATUS USING THE SAME

INCORPORATION BY REFERENCE

The present application claims priority from Japanese application JP 2008-15745 filed on Jan. 28, 2008, the content of which is hereby incorporated by reference into this application.

BACKGROUND OF THE INVENTION

This invention relates to an optical head and an apparatus having the optical head used for reproducing or recording data from or into an optical information recording medium formed of a plurality of information layers.

In recent years, optical disks such as HD DVD and Blu-ray using the blue semiconductor laser have been manufactured and commercialized as optical information recording media. Especially, Blu-ray realizes a capacity as large as 25 GB per information layer. A further increase in capacity per information layer, however, is not an easy matter due to the limit caused by diffraction of light. The future trend, therefore, is toward realization of large capacity by a plurality of information layers.

As a technique related to this invention, the recording and reproduction technique for an information recording medium having a plurality of information layers is disclosed in JP-A-08-185640 (Paragraph 8, FIG. 1) and JP-A-2006-344344 (Paragraph 29, FIGS. 29 and 33).

SUMMARY OF THE INVENTION

The optical disk is most widely used as an optical information recording medium. In the description that follows, therefore, the optical information recording medium is referred to as the optical disk and the optical information recording medium processing device as the optical disk device for simplification. In reproducing a predetermined one of the plurality of information layers of the optical disk, a light beam reflected from the particular information layer is detected by a detection element (hereinafter referred to as the detector). In the process, the light beam is also reflected from a different information layer from the intended information layer. This undesirable reflected light beam is hereinafter referred to as the unrequired reflected light beam. The unrequired reflected light beam normally proceeds to the detector and constitutes a disturbance for detection signals obtained from the detector.

JP-A-08-185640 and JP-A-2006-344344, for example, disclose an unrequired reflected light beam isolation means for isolating the unrequired reflected light beam. JP-A-08-185640 discloses a means using minuscule pinholes, and JP-A-2006-344344 a means using the polarization. These conventional techniques utilize the difference in convergence and divergence between the unrequired reflected light beam and the light beam reflected from the optical disk, and therefore, the reflected light beam is required to be converged once before being detected by the detector. The conventional technique disclosed in JP-A-08-185640, in which the light beam is converged and the detection lens is arranged ahead of the convergence point, poses a problem that the optical system becomes bulky.

JP-A-2006-344344 is intended to solve the problem of JP-A-08-185640 and to reduce the apparatus size by arranging a reflection element (hereinafter referred to as a reflector) at the convergence point. This arrangement of the reflector, however, poses a new problem that a diverging element (hereinafter referred to as a polarization prism) is required for diverging into an optical path 1 along which a light beam emitted from a light-emitting means (hereinafter referred to as a light source) proceeds to a converging means (hereinafter referred to as a objective lens) and an optical path 2 along which the light beam proceeds from the reflector to the detector. The arrangement of the polarization prism at this position, however, generates an optical path along which a part of the light beam emitted from the light source proceeds directly to the detector through the polarization prism and the light beam that has proceeded along the particular optical path constitutes a disturbance of the detection signal obtained from the detector. The light beam that has proceeded along this optical path is hereinafter referred to as an unrequired light beam.

As described above, the problem of JP-A-08-185640 is that the optical system becomes bulky, while the configuration of JP-A-2006-344344 poses a problem that the size reduction causes an unrequired light beam as a disturbance of the detection signal, thereby making it difficult to detect the reproduction signal and the servo signal in stable fashion.

This invention has been achieved in view of the problems described above, and the object thereof is to provide a compact optical head and an optical disk device in which the optical disk having a plurality of information layers can performs stable reproducing and recording operation.

The object described above is achieved, for example, by the invention described in the appended claims.

A typical invention disclosed herein is briefly described below.

Specifically, in order to achieve the aforementioned object, according to this invention, there is provided an optical head including:

a light-emitting element for emitting a light beam;

a first polarized light diverging element for transmitting, among all the light beams emitted from the light-emitting element, a light beam having a first polarization direction is transmitted while a light beam having a second polarization direction orthogonal to the first polarization direction is reflected in a different direction with respect to an optical axis of the light beam of the first polarization direction;

a second polarized light diverging element for transmitting or reflecting the light beam of the first polarization direction that has been transmitted through the first polarized light diverging element;

a converging element for converging, on an information recording medium, the light beam transmitted through or reflected from the second polarized light diverging element;

a reflection element for reflecting a first reflection light beam reflected from the information recording medium and reflected from or transmitted through the second polarized light diverging element; and a detection element for detecting a second reflection light beam reflected from the reflection element and transmitted through or reflected from the second polarized light diverging element.

This invention can realize the stable operation of reproducing and recording information in an optical disk having a plurality of information layers by suppressing or reducing the effect of the unrequired light beam.

BRIEF DESCRIPTION OF THE DRAWINGS

These and other features, objects and advantages of the present invention will become apparent from the following description when taken in conjunction with the accompanying drawings, wherein.

DETAILED DESCRIPTION OF THE EMBODIMENTS

In the embodiments of the invention described below, an optical disk device used for the recording or reproducing operation of the optical disk formed of a plurality of information layers and an optical head mounted on the optical disk device are taken as an example. Nevertheless, the invention is not limited to these embodiments.

[First embodiment]

A first embodiment of the invention is explained in detail with reference to the drawings. An explanation is given about an optical head used for an optical disk formed of a plurality of information layers.

Figure 1:
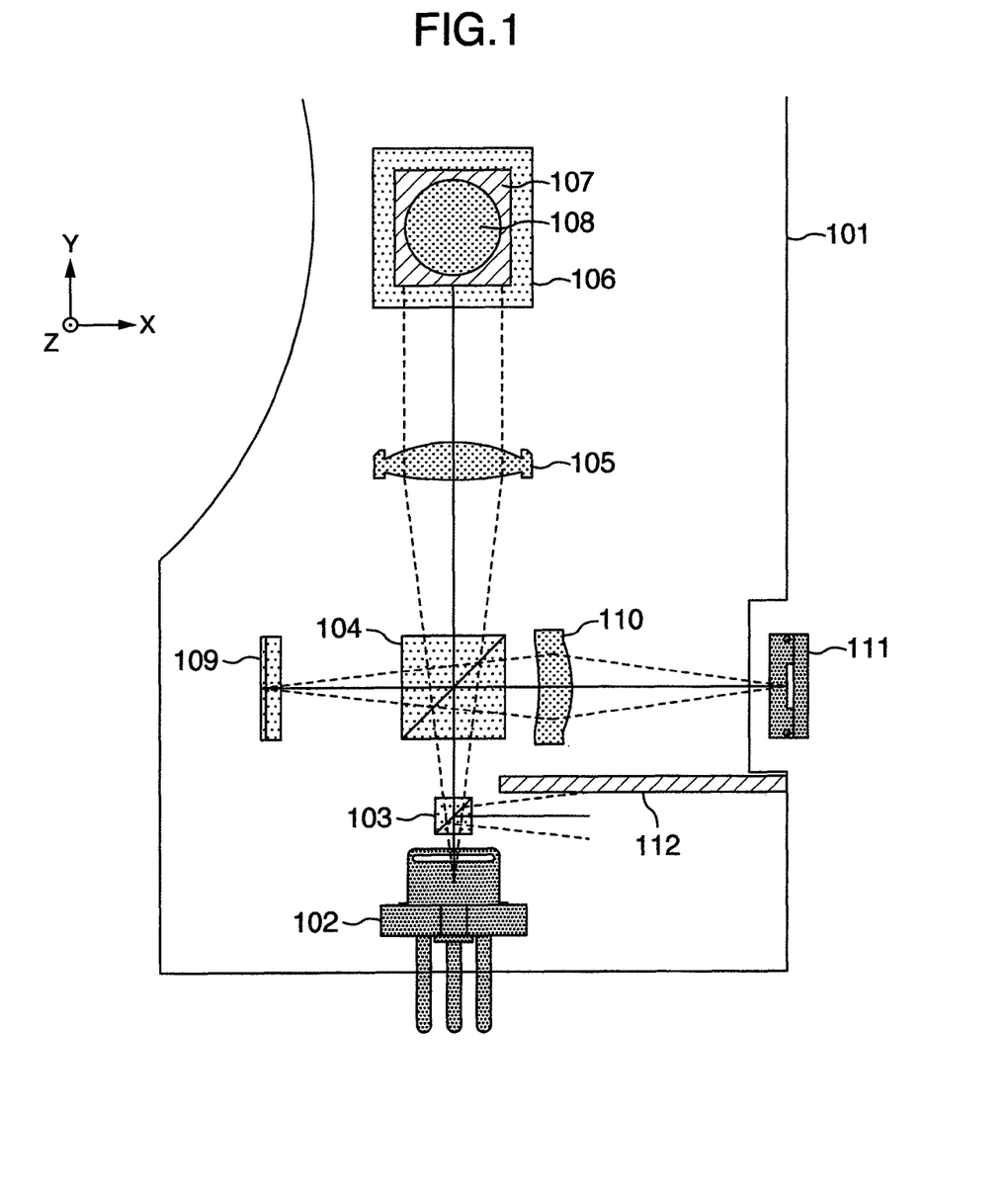
FIG. 1 is a diagram for explaining a general configuration of an optical head 101 according to a first embodiment.

FIG. 1 is a diagram showing a configuration of the optical parts of the optical head 101. An optical path along which a light beam proceeds from a light source 102 to an objective lens 108 is referred to an outward optical path and an optical path along which the light beam proceeds from the objective lens 108 to a detector 111 referred to as a homeward optical path.

First, the outward optical path is explained. The linear polarized (P-polarized) light beam vibrating in the X direction in the drawings is emitted from the light source 102 and as a divergent beam. In the drawings, the solid line extending from the light source 102 to a collimating lens 105, for example, indicates the light beam path, and the dashed lines indicates the paths outside the light beam.

The light beam emitted from the light source 102 proceeds to polarization prisms 103, 104. These polarization prisms are polarized light diverging elements for transmitting the P-polarized light beam and reflecting the S-polarized light beam in the Z direction in the drawings.

The light source used for the ordinary optical disk device is a semiconductor laser. The polarization ratio (ratio between the P- and S-polarized light beams) of the light beam emitted from the semiconductor laser in practical application is about 100 to 200 in many cases.

Assuming that the polarization ratio of the light beams emitted from the light source 102 is 100, approximately 99% of the light beam (P-polarized light) entering the polarization prism 103 is transmitted therethrough and proceeds toward the polarization prism 104. The remaining approximately 1% of the light beam (S-polarized light beam) is reflected from the polarization prism 103.

In the case where a shield wall 112 is formed as shown in FIG. 1, the light beam reflected from the polarization prism 103 is prevented from proceeding to the detector 111.

The light beam that has proceeded to the polarization prism 104 is completely P-polarized, and therefore, proceeds to the collimating lens 105 through the polarization prism 104. The collimating lens 105 has a function of converting the incident light beam into substantially parallel light. Though not shown in FIG. 1, the provision of a mechanism capable of driving the collimating lens 105 in the direction along the optical axis can change the amount of spherical aberration of the light beam converged on the optical disk. This is the reason for fact that the light beam converged for each one of a plurality of information layers of the optical disk consisting of a plurality of information layers is corrected to the optimum spherical aberration.

The light beam emitted from the collimating lens 105 is reflected on a first mirror 10 in the Z direction in FIG. 1 and converted into a circular polarized light from a linear polarized light by a ¼ wave plate 107. The light beam converted into the circular polarized light is converged on an optical disk (not shown) by an objective lens 108 mounted on an actuator (not shown).

Next, the homeward path is explained. The light beam reflected on a predetermined information layer of the optical disk is converted again into a substantially parallel light beam by the objective lens 108 and proceeds to the ¼ wave plate 107. In the ¼ wave plate 107, the light beam is converted again from the circular polarized light into the linear polarized light orthogonal to the linear polarized light entering the ¼ wave plate 107 on the outward path.

The light beam that has passed through the ¼ wave plate 107 proceeds to the polarization prism 104 through the first mirror 106 and the collimating lens 105. The light beam that has entered the polarization prism 104, which is converted into the linear polarized light (S-polarized light) orthogonal to the outward path, is reflected from the polarization prism 104 and proceeds to the reflector 109.

The reflector 109 is an element having triple functions of a ¼ wave plate, a reflection element and means for separating an unrequired reflected light beam. The reflector 109 first functions as the ¼ wave plate to convert the incident light beam into a circular polarized light beam from the linear polarized light (S-polarized light) beam. Next, the reflected light beam from a predetermined information layer and the unrequired reflected light beam are separated from each other. At the position where the light beam is converged most, the light beam is reflected and the reflected light beam is again converted into the linear polarized light (P-polarized light) beam from the circular polarized light by the function as the ¼ wave plate.

Specifically, the light beam that has entered the reflector 109 is separated from the unrequired reflected light beam while at the same time being converted into the linear polarized light orthogonal to the incident linear polarized light. The resultant light beam is then reflected and proceeds to the polarization prism 104.

The light beam that has entered the polarization prism 104 for the third time, being P-polarized light, passes through the polarization prism 104 and through the detection lens 110, and reaches the detector 111. The light beam having passed through the detection lens 110 is subjected to a predetermined astigmatism and is used for detection of the focusing error signal of the optical disk according to the differential astigmatism scheme. The detection lens 110 has dual functions of rotating the astigmatism in a predetermined direction and determining the size of light spot on the detector 111. The light beam led to the detector 111 is used to detect information signals recorded on the optical disk on the one hand and to detect a position control signal of the light spot on the optical disk such as tracking error signal and focusing error signal on the other hand.

In the case described above, the reflector 109 has triple functions including reflection, removal of unrequired light and a ¼ wave plate. Nevertheless, only the ¼ wave plate may be an independent function. Also, the PBS prism 104 and the reflector 109 may be integrated with each other.

Figure 2:
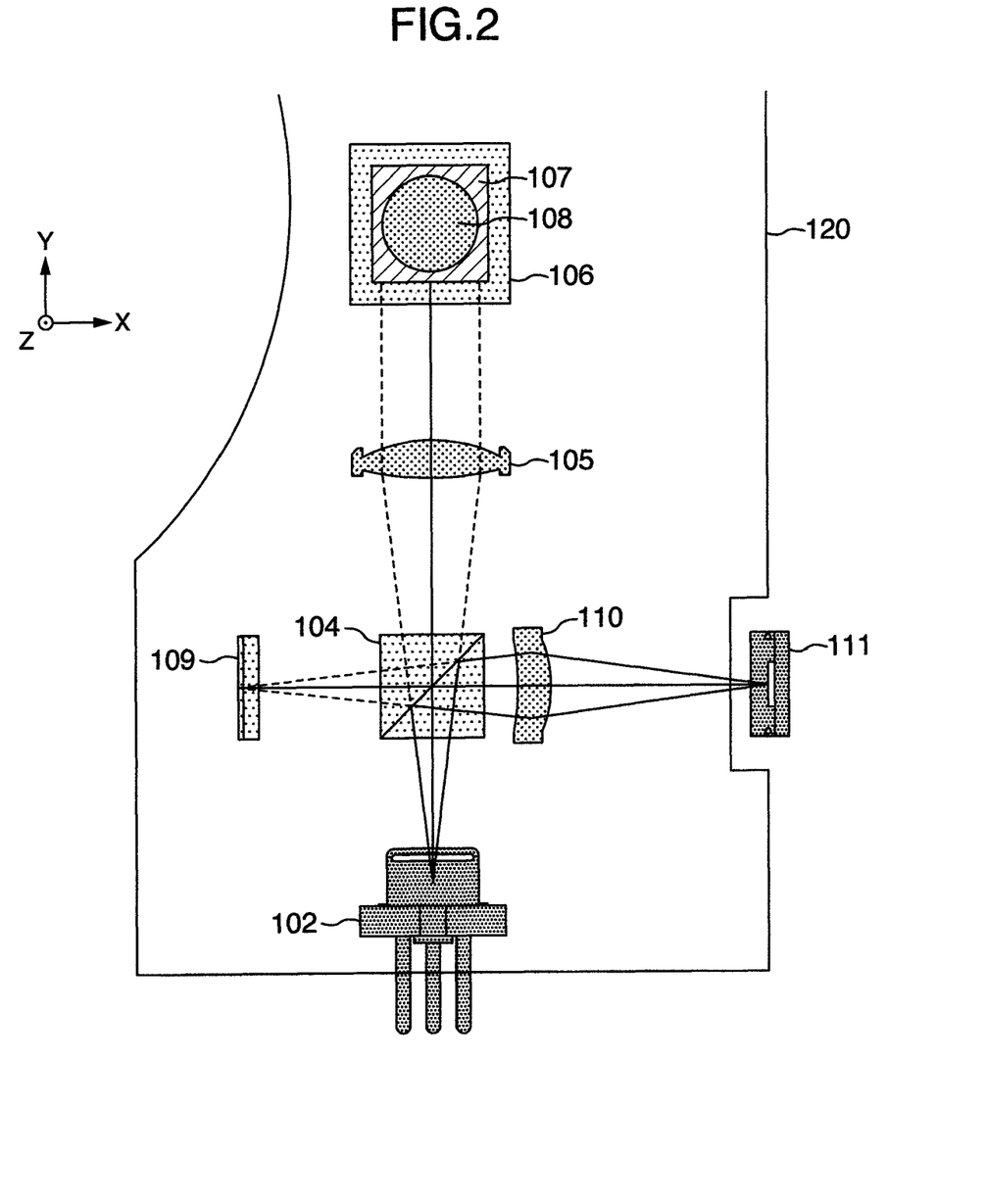
FIG. 2 is a diagram for explaining the unrequired light beam.

Next, an explanation is given about a case lacking the polarization prism 103 with reference to FIG. 2. FIG. 2 is a diagram showing a configuration of the optical parts of an optical head 120 in the absence of the polarization prism 103 in FIG. 1. In FIG. 2, the same component parts as those in FIG. 1 are designated by the same reference numerals, respectively.

The light beam emitted from the light source 102 proceeds to the polarization prism 104. Assuming that the polarization ratio of the light beam emitted from the light source 102 is 100, representing approximately 99% of the light beam (P-polarized) that entered the polarization prism 104 transmits and proceeds to the collimating lens 105. The remaining approximately 1% of the light beam (S-polarized) proceeds to the detection lens 110 and further to the detector 111. In FIG. 2, the outside part of the S-polarized light beam is indicated by thick solid lines.

Specifically, as shown in FIG. 2, an unrequired light beam proceeding to the detector 111 through the polarization prism 104 is generated in the absence of the polarization prism 103. The light quantity of this unrequired light beam is comparatively small and 1% of the light beam proceeding to the collimating lens 105. The light beam entering within the effective diameter of the objective lens 108 through the collimating lens 105, however, is at most about 30% for Blu-ray optical disk devices. Also, the reflective index of the optical disk configured of a plurality of information layers is very low and, for example, 28% even for the maximum of the standard of Blu-ray having two information layers. Accordingly, the light beam reflected from the optical disk and returning to the detector is at most 8.4% (30%×28%). In other words, the ratio of the unrequired light beam is considered to amount to at least 12% (1%÷8.4%) of the light beam having the information of reproduction signals. Also, the minimum value of the Blu-ray standard is about 12%, and a similar calculation shows that the ratio of the unrequired light beam is approximately 27%.

Also, in the case where the light source 102 is mounted on the optical head 120, the ratio of the S-polarized light increases and so does the ratio of the unrequited light beam due to rotational deviation along the direction of the optical axis or rotational deviation of the light source 102 when mounted in the housing.

In this configuration allowing ten % or more disturbances in the reproduction signal, stable reproduction or recording operation may become impossible.

Next, the principle of generation of the unrequited reflected light beam and the separation of the unrequired reflected light beam using the reflector 109 are explained with reference to FIGS. 10A and 10B.

Figure 10A:
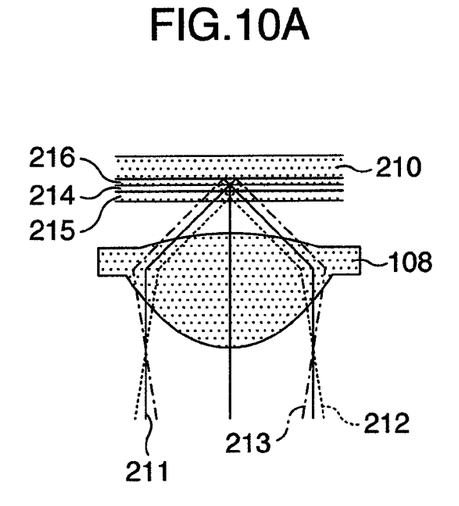
FIG. 10A is a diagram for explaining the principle of generation of the unrequited reflected light beam according to the first embodiment.
Figure 10B:
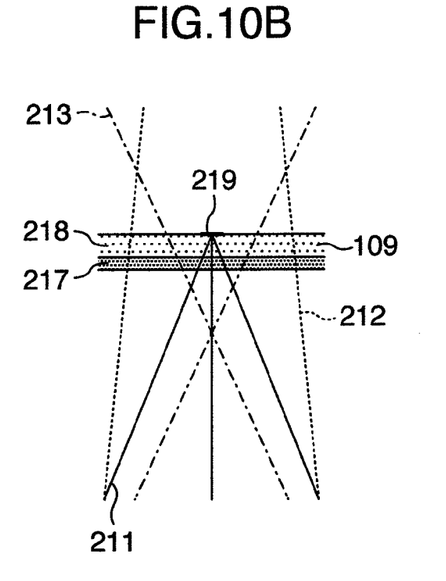
FIG. 10B is a diagram for explaining the principle of separating the unrequited reflected light beam from the reflector 109.

FIG. 10A shows the principle of generation of the unrequired reflected light beam, and FIG. 10B the principle of separation of the unrequired reflected light beam.

First, with reference to FIG. 10A, the principle of generation of the unrequired reflected light beam is explained. FIG. 10A illustrates a light beam converged on the optical disk 210 formed of three information layers by the objective lens 108. Optical paths 211, 212, 213 indicate the circumferences of the light beam. Also, in this case, access to the information in the information layer 214 of the optical disk 210 is assumed.

The substantially parallel light beam, proceeding along the optical path 211 upward from the lower part of the page, is converged on the information layer 214 of the optical disk 210 by the objective lens 108. The light beam converged on the information layer 214 is reflected on the information layer 214, and passing along the optical path 211 again, converted into a substantially parallel light beam by the objective lens 108.

In the process, some part of the light beam is reflected on the information layer 215 before reaching the information layer 214. The light beam reflected on the information layer 215 proceeds along the optical path 212. This light beam, which proceeds along an optical path different from the optical path 211, is not converted into a substantially light beam in the objective lens 108 but continues to proceed as a slightly diverged light beam.

Another part of the light beam is reflected on the information layer 216 after being transmitted through the information layer 214. The light beam reflected on the information layer 216 proceeds along the optical path 213. The light beam proceeds along an optical path different from the optical path 211, and therefore, is not converted into a substantially parallel light beam in the objective lens 108, but continues to proceed as a slightly converged light beam.

As described above, the light beam converged on the optical disk 210 formed of three information layers is diverged mainly into three reflected light beams and return to the objective lens 108. These light beams, other than the one reflected on the information layer 214, form the unrequited reflected light beams lacking the information in the information layer 214.

Next, an example of the principle of separation of the unrequired reflected light beam is explained with reference to FIG. 10B. FIG. 10B shows the relationship between the reflector 109 and the three reflected light beams 211, 212, 213 described above. The reflector 109, as explained above, has the functions as the ¼ wave plate 217, the reflection element 219 and the means for separating the unrequired reflected light beam. The reflected light beam 211 having the information in the information layer 214, upon incidence on the reflector 109, is focused at a point on the reflection element 219, reflected from the reflection element 219 and returns along the optical path 211.

The unrequired reflection light beams 212, 213, on the other hand, are not converged at a point on the reflection element 219, and therefore, transmit therethrough. Thus, the function of separating the unrequired reflected light beam can be realized by partly forming the reflection element 219 on the reflector 109 as shown in FIG. 10B.

The region other than the reflection element 219, though configured to transmit the light beam, may alternatively be formed of a rough surface or polarization may be used as disclosed in JP-A-2006-344344. In other words, any form may be used which has the function of separating the unrequited reflected light beam.

As described above, this embodiment realizes a stable reproduction and recording operation by preventing the unrequited light beam and the unrequired reflected light beam from proceeding to the detector 111.

[Second embodiment]

Figure 3:
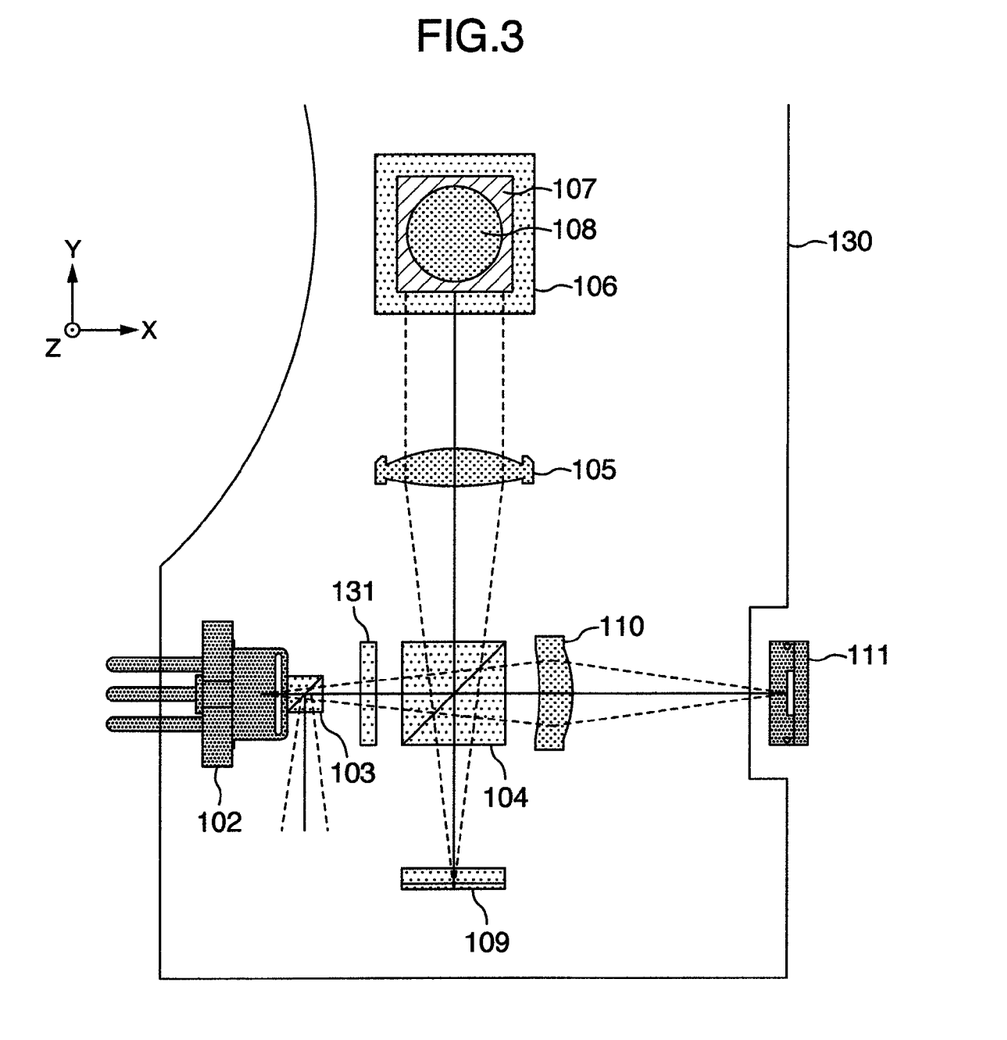
FIG. 3 is a diagram showing a general configuration of an optical head 130 according to a second embodiment.

A second embodiment of the invention is explained with reference to the drawings. A modification of the optical head 101 shown in FIG. 1 is explained as an example. FIG. 3 is a diagram showing a configuration of the optical parts of an optical head 130. The optical head 130 is different from the corresponding optical head shown in FIG. 1 in that the light source 102, the polarization prism 103 and the reflector 109 are rearranged and an azimuth rotator 131 is added.

The light source 102 emits diverging light as a linearly polarized (P-polarized) light beam vibrating in the X direction in FIG. 3. The S-polarized light beam emitted from the light source 102, like in the first embodiment, is reflected on the polarization prism 103, while the P-polarized light beam proceeds to the azimuth rotator 131. The azimuth rotator 131 has a function of rotating the phase of the incident light beam by 90 degrees. Specifically, the light beam incident on the azimuth rotator 131 is converted from the P- to S-polarized light and proceeds to the polarization prism 104. The light beam which entered the polarization prism 104, being the S-polarized light, is reflected and proceeds to the collimating lens 105. As explained above, this embodiment is different in polarization from the first embodiment, and therefore, proceeds along a different optical path. Thus, the light beam, after being emitted from the collimating lens 105, proceeds through the first mirror 106 and the ¼ wave plate 107 to the objective lens 108.

After being reflected on a predetermined information layer of the optical disk, on the other hand, the light beam returns along the homeward path through the objective lens 108, the ¼ wave plate 107, the first mirror 106, the collimating lens 105, the polarization prism 104, the reflector 109, the polarization prism 104, the detection lens 110 and the detector 111. Also in this configuration, as explained in the first embodiment, the arrangement of the polarization prism 103 shown in FIG. 2 makes it possible to prevent the unrequired light beam from proceeding to the detector 111 so that the stable reproduction and recording operation can be realized.

Also, as shown in FIG. 3, the polarization prism 103 may be attached to the light source 102. By integrating the light source 102 and the polarization prism 103 as shown in FIG. 3, the fabrication and design of a compact optical head is advantageously facilitated.

[Third embodiment]

Figure 4:
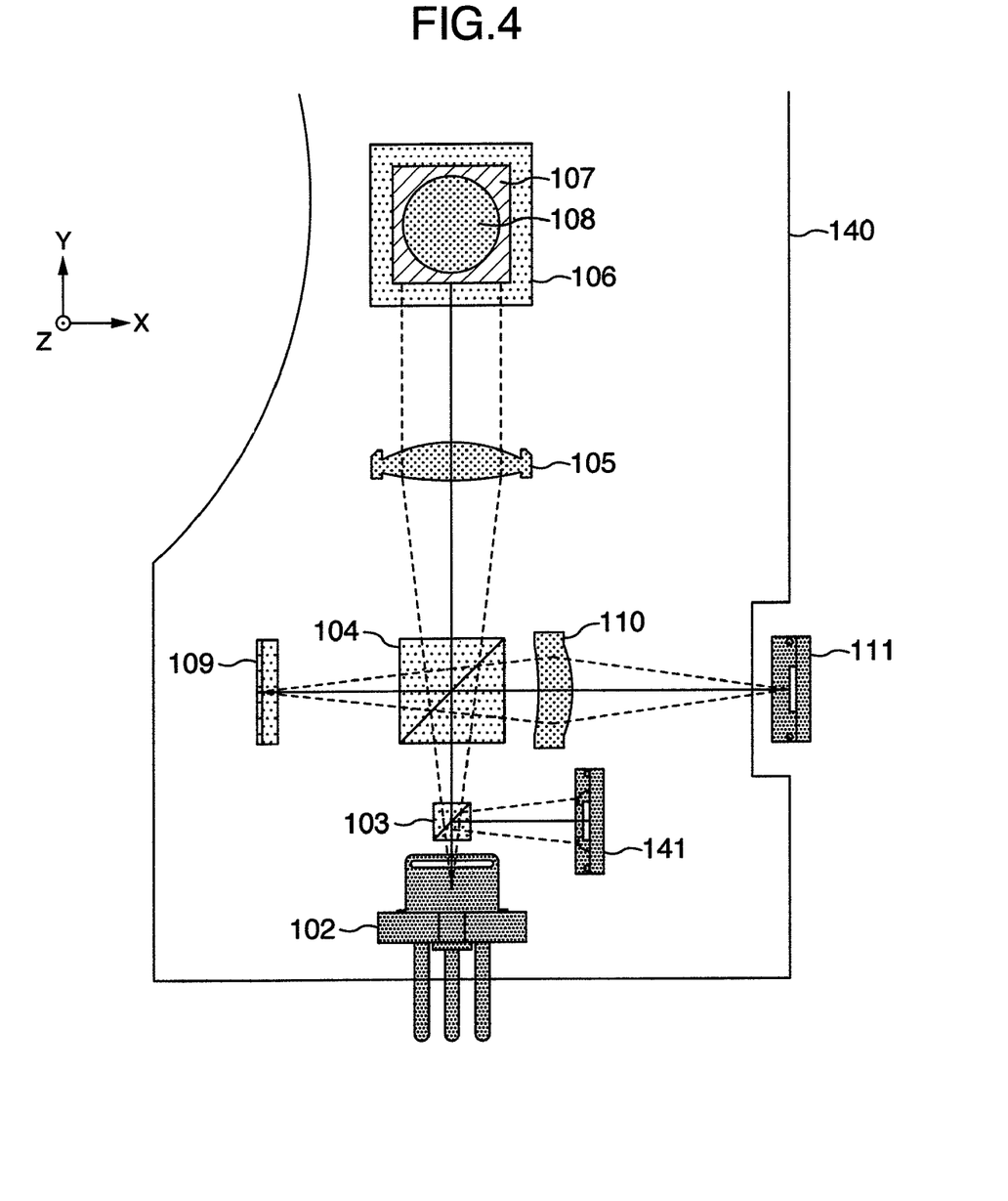
FIG. 4 is a diagram showing a general configuration of an optical head 140 according to a third embodiment.

A third embodiment of the invention is explained with reference to FIG. 3. In this case, a modification of the optical head 101 shown in FIG. 1 is taken as an example. FIG. 4 is a diagram showing a configuration of the optical parts of the optical head 140. FIG. 4 is different from FIG. 1 in that a front monitor 141 is added.

The light beam (S-polarized) emitted from the light source 102 is reflected on the polarization prism 103 and proceeds to the front monitor 141.

In the information recording and reproduction apparatus having an ordinary optical head, the light quantity of a light beam radiated on the optical disk is required to be controlled at a constant level to assure the stable recording and reproduction process. Thus, the optical head includes a means (generally called a front monitor) for detecting the light quantity of the light beam emitted from the light source, and by feeding back the detected light quantity to the light source, the light quantity of the light beam radiated on the optical disk is accurately controlled.

The front monitor 141, therefore, is arranged to monitor the light quantity of the light beam radiated on the optical disk. By arranging the front monitor 141 like the optical head 140, the light beam reflected on the polarization prism 103 can also be used unwastefully.

[Fourth embodiment]

Figure 5:
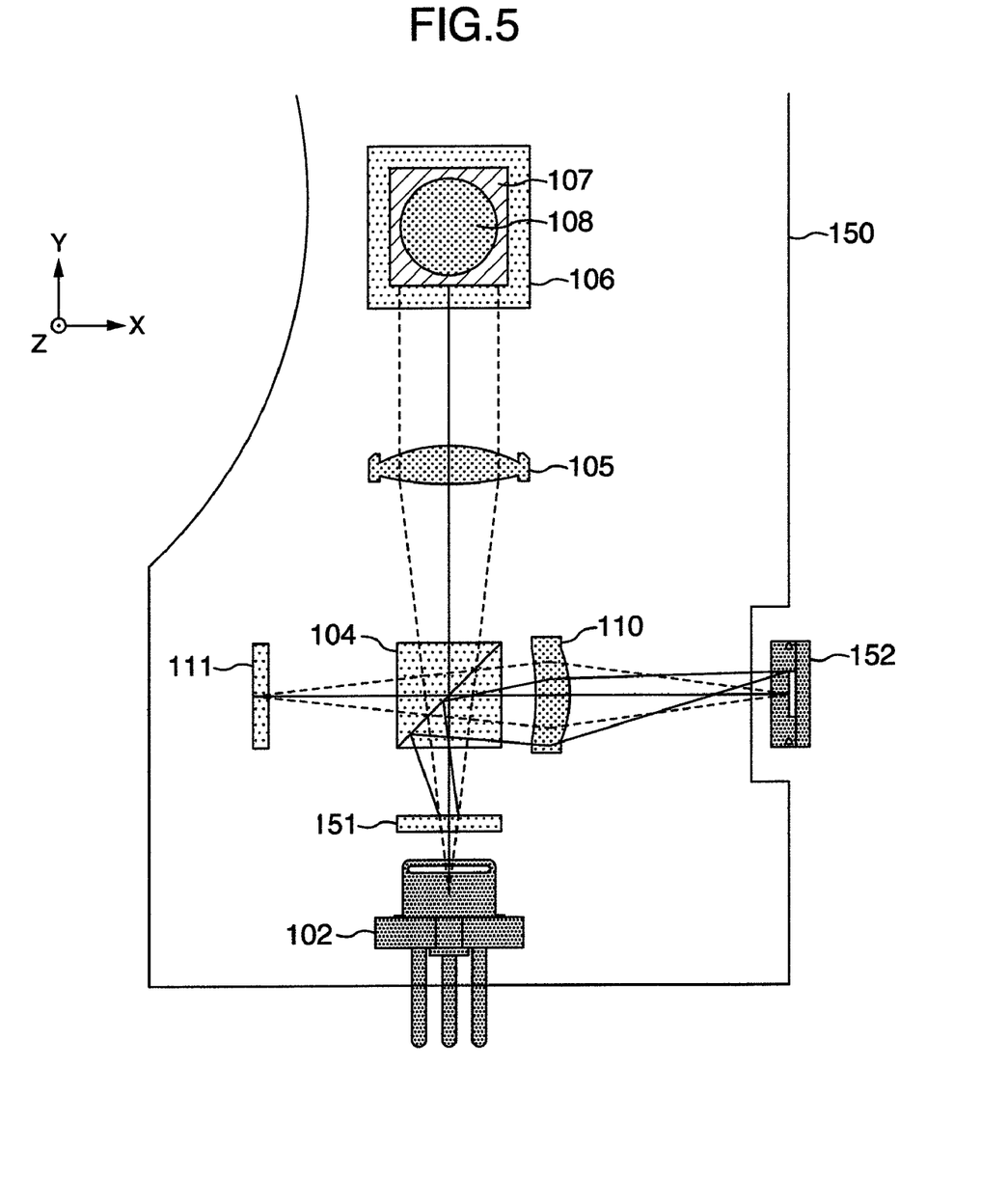
FIG. 5 is a diagram for explaining a general configuration of an optical head 150 according to a fourth embodiment.

A fourth embodiment of the invention is explained with reference to FIG. 4. In this case, a modification of the optical head 140 shown in FIG. 4 is taken as an example. FIG. 5 shows an arrangement of the optical parts of an optical head 150.

According to this embodiment, as compared with the optical head 140 shown in FIG. 4, the polarization prism 103 is mounted on the polarized light diffraction grating 151, and the front monitor 141 is not arranged. Also, the detector 152 has the same function as the front monitor.

The polarized light diffraction grating 151 is a diffraction element having a function of transmitting the P-polarized light beam and diffracting the S-polarized light beam. Also in the case where this polarized light diffraction grating is arranged in place of the polarization prism, the unrequired light described in the first embodiment can be prevented from proceeding to the detector.

When the light beam which was emitted from the light source 102 proceeds to the polarized light diffraction grating 151, the P-polarized light beam directly passes and proceeds to the polarization prism 104 and the collimating lens 105.

The S-polarized light beam, on the other hand, is diffracted by the polarized light diffraction gratin 151. In the drawing, the circumference of the diffracted light beam is indicated by thick solid lines. The light beam diffracted by the polarized light diffraction grating 151 is the S-polarized light. This light beam, therefore, is reflected on the polarization prism 104 and proceeds to the detector 152 through the detection lens 112. This diffracted light beam has a different optical path than the light beam reflected on the optical disk, and therefore, is not superposed on the light beam reflected from the optical disk on the surface of the detector 151. As a result, the light beam diffracted by the polarized light diffraction grating 151 never becomes the unrequired light beam unlike in the first embodiment.

The provision of the detection surface of the detector 152 for receiving the diffracted light beam permits the detector 152 also to have the function of the front monitor described in the fourth embodiment.

Figure 6:
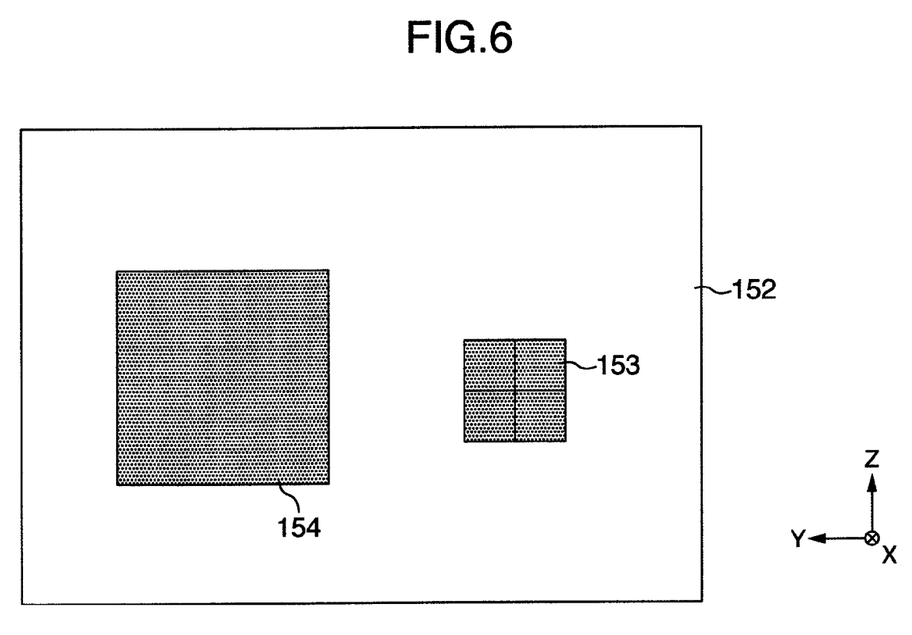
FIG. 6 is a diagram for explaining a detector 152 according to the fourth embodiment.

FIG. 6 illustrates a detection surface pattern of the detector 152. The detector 152 has a four-division detection surface 153 for receiving the light beam reflected from the optical disk, and a detection surface 154 for receiving the light beam diffracted by the polarized light diffraction grating 151.

As described above, the configuration for avoiding the unrequired light beam can be realized also by arranging the polarized light diffraction grating 151 in place of the polarization prism 103. Also, by appropriately designing the grating pattern of the polarized light diffraction grating 151, the light can be rendered to proceed to the detector 152, thereby realizing the detector having the dual functions of the front monitor and the detector. By omitting the front monitor in this way, the number of the parts can be reduced.

[Fifth embodiment]

Figure 7:
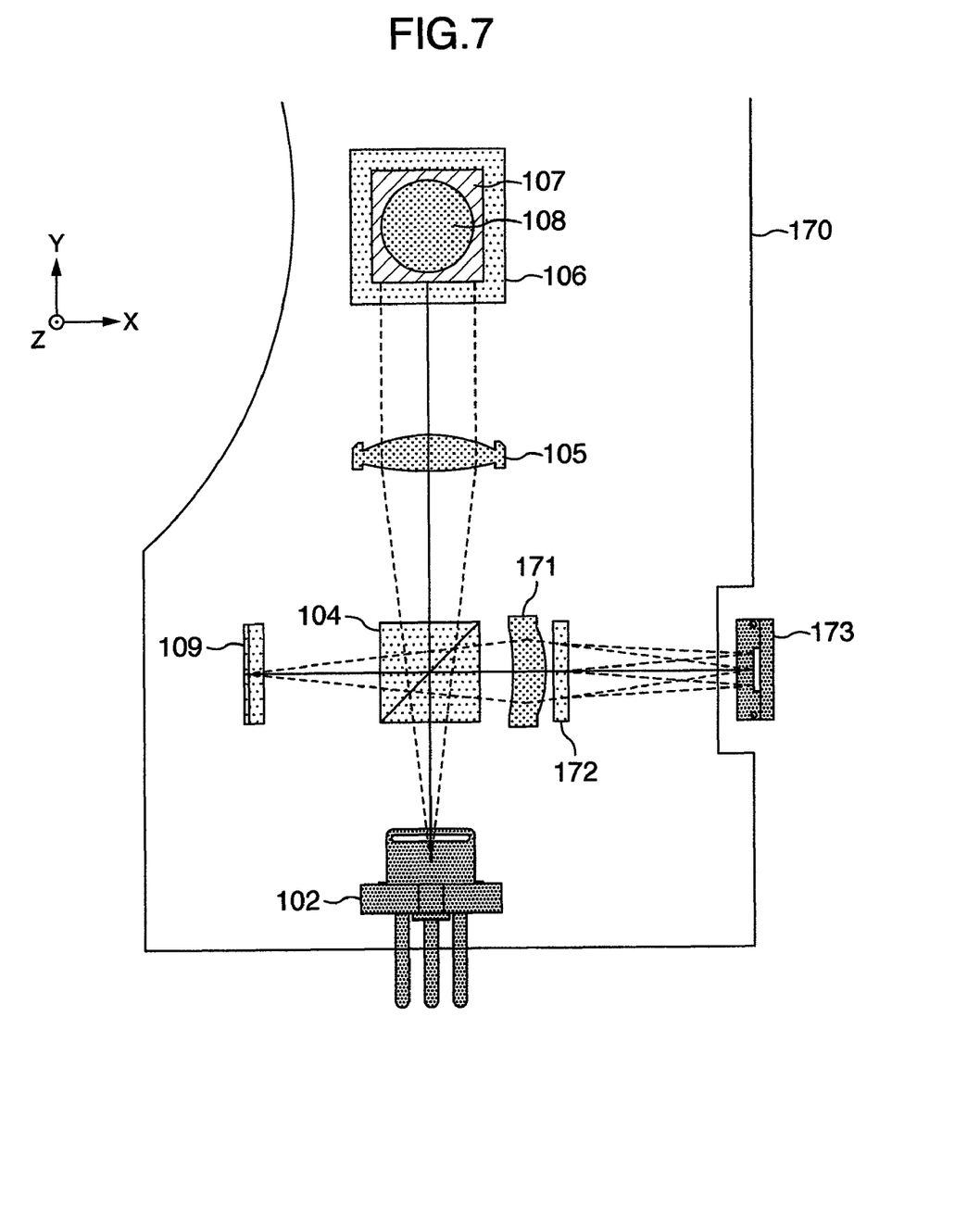
FIG. 7 is a diagram for explaining an optical head 170 according to a fifth embodiment.

A fifth embodiment of the invention is explained in detail with reference to the drawings. In this case, a modification of the optical head 101 shown in FIG. 1 is explained. FIG. 7 shows an arrangement of the optical parts of an optical head 170.

The optical head 170 is different from the optical head 101 shown in FIG. 1 in the use of the knife edge method for detecting focusing error signals.

The optical path of the light beam from the light source 102 to the objective lens 108 is called an outward path, and the optical path of the light beam from the objective lens 108 to the detector 173 a homeward path. First, the outard path is explained. The linear polarized (P-polarized) light beam vibrating in the X direction in FIG. 7 is emitted as a divergent light from the light source 102. Incidentally, the solid line extending from the light source 102 to the collimating lens 105 in FIG. 7, for example, indicates an optical path of the light beam and the dashed lines a circumference path outside the light beam.

The light beam emitted from the light source 102 proceeds to the polarization prism 104. The (P-polarized) light beam emitted from the light source 102 passes through the polarization prism 104 and proceeds to the collimating lens 105, where it is converted into a substantially parallel light beam. After that, as described above, the light beam proceeds to the first mirror 106, the ¼ wave plate 107 and the objective lens 108 and is focused on the optical disk (not shown).

Incidentally, the light beam (S-polarized) emitted from the light source 102 is reflected on the polarization prism 104 and, thus becoming the unrequited light beam as described above, proceeds to the detection lens 171. The detection lens 171 is a normal spherical lens having no function to generate astigmatism unlike the 110. The unrequired light beam is converted into the unrequired light beam of the converged light by the detection lens 171. Next, the light beam proceeds to a regional diffraction grating 172. The regional diffraction grating 172 has the polarization characteristic, so that the S-polarized light is transmitted while the P-polarized light is diffracted. Specifically, the unrequited light beam (S-polarized) is converged on the detector 173 without being diffracted. The detector 173 has a detection surface for receiving the unrequited light beam and has a function of a front monitor.

In this case, the regional diffraction grating 172 is assumed to transmit the S-polarized light. Nevertheless, the regional diffraction grating 172 may alternatively diffract the S-polarized light to such an extent as not to enter the detector 173. In this case, although an independent front monitor is required, the light beam can be entirely prevented from proceeding to the detector 172.

Next, the homeward path is explained. The light beam reflected on a predetermined information layer of the optical disk is again converted into a substantially parallel light beam by the objective lens 108 and proceeds to the ¼ wave plate 107. In the ¼ wave plate 107, the light beam is converted again from the circular polarization to the linear polarization. In this way, the light beam is converted into a linear polarized light orthogonal to the linear polarized light that has entered the ¼ wave plate 107 in the outward path.

The light beam that has passed through the ¼ wave plate 107 proceeds to the polarization prism 104 through the first mirror 106 and the collimating lens 105. The light beam entering the polarization prism 104 is converted into the linear polarized (S-polarized) light orthogonal to the outgward path, and therefore, reflected on the polarization prism 104 and proceeds to the reflector 109.

As described above, the light beam incident to the reflector 109 is separated from the unrequited reflected light beam while at the same time being converted into the linear polarized light orthogonal to the incident linear polarized light and, after being reflected, proceeds to the polarization prism 104.

The light beam that has entered the polarization prism 104, being the P-polarized light, passes through the polarization prism 104 and enters the regional diffraction grating 172 through the detection lens 171. This regional diffraction grating 172 has a function of diffracting the P-polarized light in different directions region by region, and is used to generate the focusing error signal according to the knife edge method. The light beam is regionally diffracted by the regional diffraction grating 172 and reaches the detector 173.

The light beam led to the detector 173 is used to detect the information signal recorded on the optical disk on the one hand, and to detect the position control signal of the light spot on the optical disk such as the tracking error signal or the focusing error signal on the other hand.

The unrequired light beam is converged on the central portion of the detector 173 without being diffracted. However, the light beam reflected on the optical disk is diffracted by the regional diffraction grating 172, so that it is radiated on a different region from the central portion. As a result, the unrequited light beam has no effect as a disturbance on the light beam having the information of the optical disk.

Figure 8A:
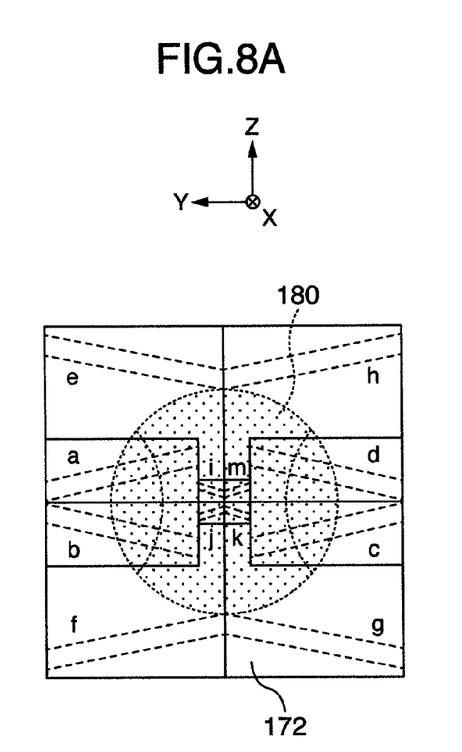
FIG. 8A is a diagram for explaining a regional diffraction grating 172 according to the fifth embodiment.

Next, an example of the regional diffraction grating 172 and the detector 173 is explained with reference to FIG. 8. Although an example of the knife edge method is shown, the invention is of course not limited to the shown pattern. FIG. 8A shows a pattern of the regional diffraction grating 172, and FIG. 8B shows a pattern of the detector 173.

The regional diffraction grating 172 has 12 surface regions as shown in FIG. 8A. In FIG. 8A, the alphabets in the drawing indicate the names of the respective regions. Also, the light beam 180 is radiated on the regional diffraction grating 172. The dashed line in each region indicates the direction along which grating grooves of the diffracting grating are formed.

Figure 8B:
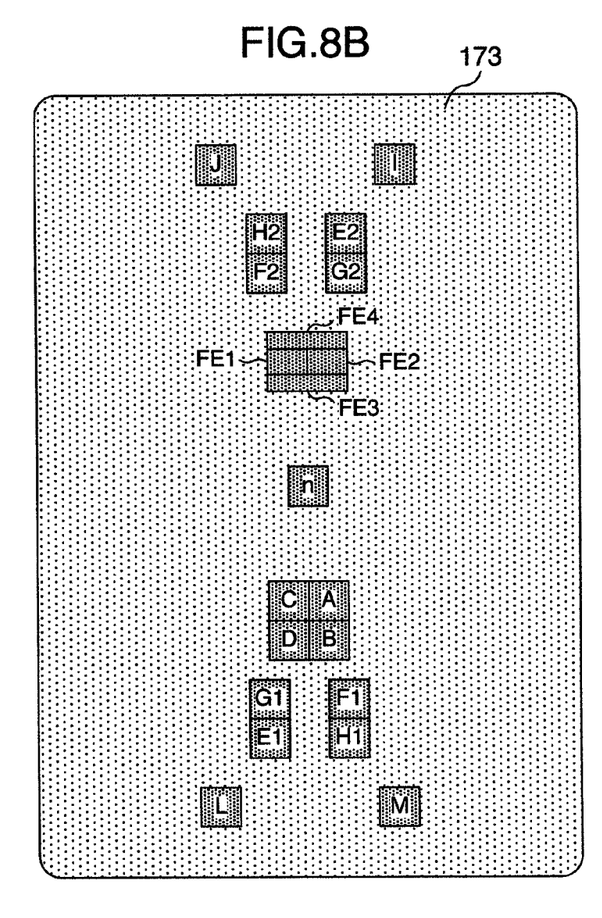
FIG. 8B is a diagram for explaining a detector 173 according to the fifth embodiment.

The detector 173 has 21 detection surfaces as shown in FIG. 8B. The detection surfaces are also indicated by alphabets, respectively, attached thereto. The relationship between each region (a, b, . . . ) of the regional diffraction grating 172 and each detection surface (A, B) of the detector 173 is such that the light beam diffracted in the region a, for example, is incident on the detection surface A and between the detection surfaces FE1 and FE3.

The light beam diffracted in the region b is incident on the detection surface B and between the detection surfaces FE1 and FE4.

The light beam diffracted in the region c is incident on the detection surface C and between the detection surfaces FE2 and FE3.

The light beam diffracted in the region d is incident on the detection surface D and between the detection surfaces FE2 and FE4.

The light beam diffracted in the region e is incident on the detection surfaces E1 and E2.

The light beam diffracted in the region f is incident on the detection surfaces F1 and F2.

The light beam diffracted in the region g is incident on the detection surfaces G1 and G2.

The light beam diffracted in the region h is incident on the detection surfaces H1 and H2.

The light beam diffracted in the region i is incident on the detection surfaces I and L.

The light beam diffracted in the region l is incident on the detection surfaces I and L.

The light beam diffracted in the region j is incident on the detection surfaces J and M.

The light beam diffracted in the region m is incident on the detection surfaces J and M.

Also, the detection surface n is for detecting the unrequited light beam described above and has a function of a front monitor.

The light beam diffracted by the regional diffraction grating 172 generates the positive and negative first-order diffracted light, and therefore, there are two corresponding detection surfaces for each region.

Now, the focusing error signal can be obtained according to the knife edge method by generating a difference output between a signal representing the sum of the detection surfaces EF1 and EF2 and a signal representing the sum of the detection surfaces EF3 and EF4. Incidentally, the knife edge method for generating the focusing error signal is also a generally known technique and therefore not described in detail.

The disturbances of the unrequired reflected light beam and the unrequired light beam can be removed from the detection signal on the optical disk also by using the knife edge method as in the optical head 170.

Also, the polarization prism 103 of the optical pickup shown in FIG. 1 can be added to the optical pickup having the configuration shown in FIG. 7.

[Sixth embodiment]

Figure 9:
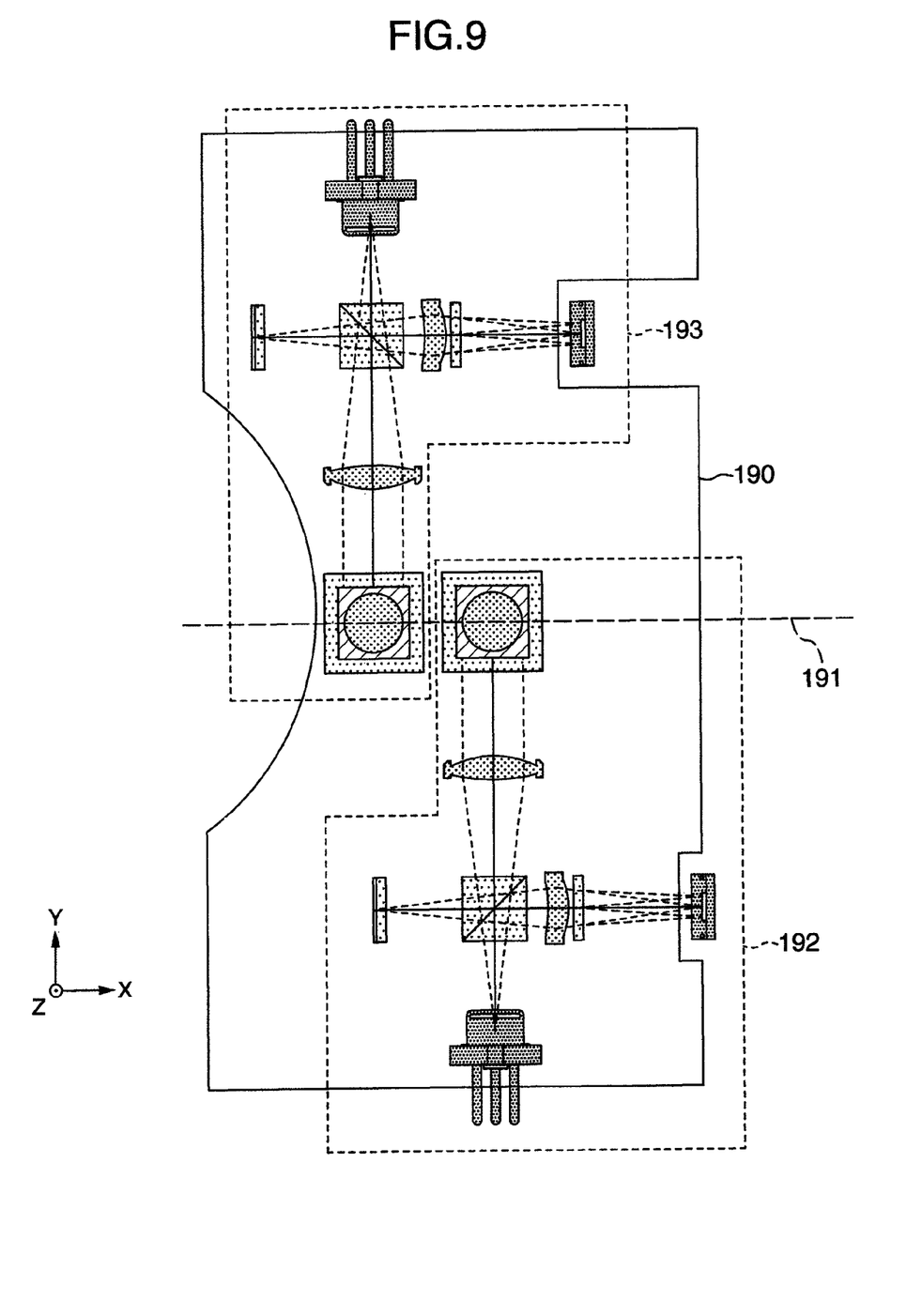
FIG. 9 is a diagram showing a general configuration of an optical head 190 according to a sixth embodiment.

A sixth embodiment of the invention is explained in detail with reference to the drawings. A modification of the optical head 170 shown in FIG. 7 is explained as an example. FIG. 9 shows an arrangement of the optical parts of an optical head 190. In the optical head 190, as shown in FIG. 9, an optical part arrangement 192 of the optical head 170 and the optical part arrangement 193 bilaterally symmetric with the optical part arrangement 192 about a dotted line 191 are arranged by being displaced from each other in the X direction. In this arrangement, recording capacity twice as large and the operating speed twice as high can be realized by driving the two optical systems with respect to a single optical disk.

Also, the optical system of the optical part arrangement 192 shown in FIG. 9 may be replaced by the conventional devices such as DVD or CD capable of recording or reproducing the optical disk or any of various combinations thereof. By doing so, compatibility with the conventional optical disk is also realized easily.

[Seventh embodiment]

According to a seventh embodiment, an explanation is given about an optical disk device 001 on which the optical head is mounted described in the first embodiment.

Figure 11:
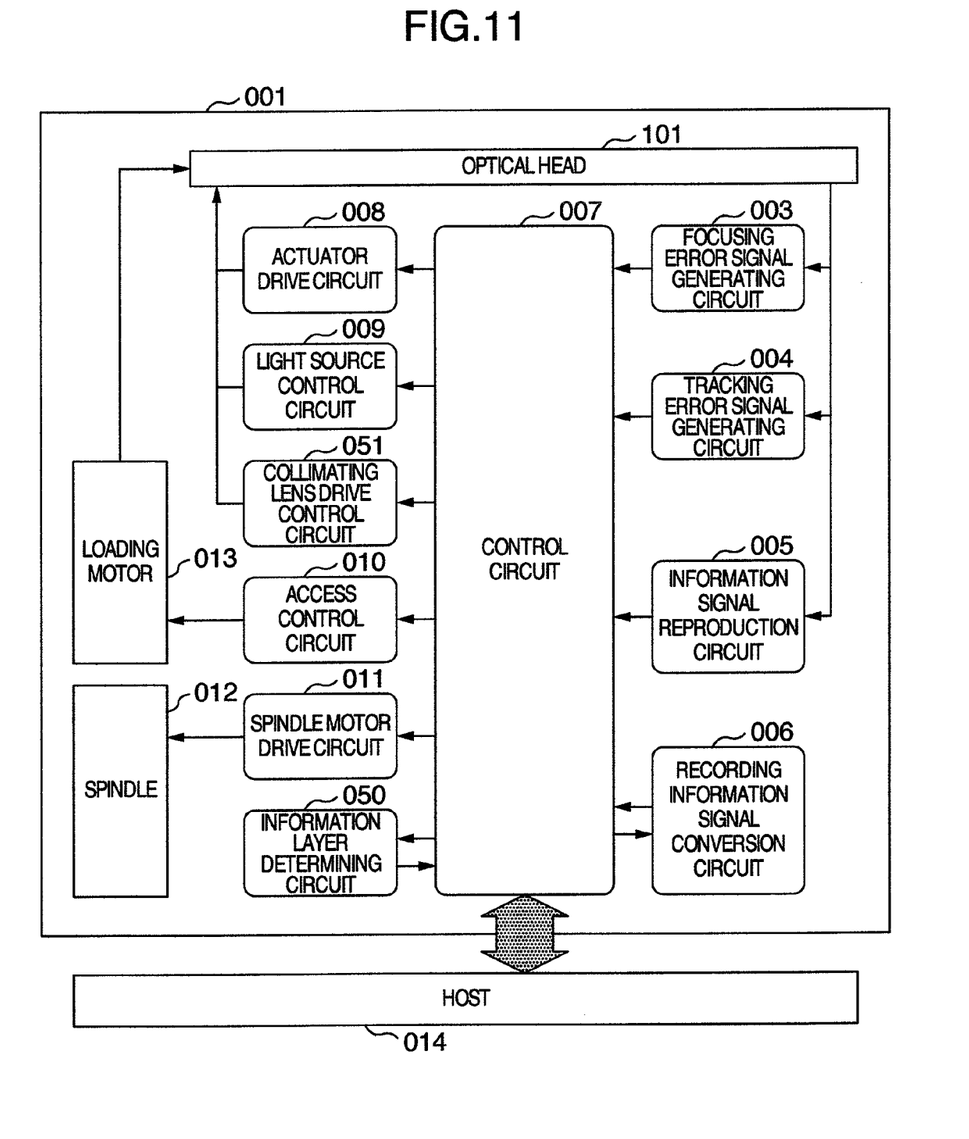
FIG. 11 is a block diagram showing a general circuit configuration of the optical disk device 101 according to a seventh embodiment.

FIG. 11 is a block diagram showing a general circuit configuration of the optical disk device 001 on which the optical head 101 is mounted according to the first embodiment.

First, the reproduction process is explained. A host 014 is an information home appliance such as a personal computer using the optical disk device. Upon application of a command from the host 014 to a control circuit 007 in the optical disk device 001 to reproduce the information in the optical disk (not shown), the control circuit 007 drives a spindle motor drive circuit 011 and thus drives a spindle 012 thereby to start the rotation of the optical disk.

Next, the control circuit 007 drives a light source control circuit 009 and turns on the light source 102 with the reproduction light quantity.

Next, the control circuit 007 drives an actuator drive circuit 008, so that the actuator in the optical head 101 is driven in the direction along the height thereof. The signal detected from the detector 111 of the optical head 101 is sent to a tracking error signal generating circuit 004, a focusing error signal generating circuit 003 and an information signal reproduction circuit 005. First, a the focusing error signal generated from a focusing error signal generating circuit 003 is sent to the information layer determining circuit 050 by the control circuit 007. In an information layer determining circuit 050, the number of what is called S-shaped waveforms of the focusing error signal is counted thereby to determine the number of the information layers of the optical disk, and a resulting information is fed back to the control circuit 007. The control circuit 007, upon receipt of the signal from the information layer determining circuit 050, judges which information layer is to be accessed. In order to access a predetermined information layer, the control circuit 007 drives a collimating lens drive control circuit 051 thereby to drive the collimating lens 105 in the direction along the optical axis. The control circuit 007 controls the collimating lens drive control circuit 051 in such a manner as to maximize the amplitude of the focusing error signal of the predetermined information layer. Namely, the spherical aberration is corrected, and once the point of maximum amplitude is determined, the control circuit 007 performs the focusing operation by controlling the actuator drive circuit 008.

Next, the control circuit 007, while monitoring the amplitude of the tracking error signal generated by the tracking error signal generating circuit 004, controls the collimating lens drive control circuit 051 and corrects the spherical aberration. In this way, the collimating lens 105 is controlled in such a manner as to maximize the amplitude of the tracking error signal. In this case, by detecting the maximum amplitude of the focusing error signal, the collimating lens 105 is controlled with higher accuracy. The control circuit 007, after complete detection of the maximum amplitude point of the tracking error signal (TES), controls the actuator drive circuit 008 thereby to start the tracking.

Next, the control circuit 007, while monitoring the amplitude of the reproduction signal generated from the information signal reproduction circuit 005, drives the collimating lens drive control circuit 051 again and corrects the spherical aberration thereby to maximize the amplitude of the reproduction signal or to minimize jitters. In this case, the position of the collimating lens 105 is controlled with the minimum resolution. After this operation, the control circuit 007 ends the correction of the spherical aberration. The control circuit 007 outputs the reproduction signal with the corrected spherical aberration to the host 014.

While monitoring the focusing error signal, the tracking error signal and the reproduction signal in this way, the collimating lens drive control circuit 051 is controlled thereby to realize the correction of the spherical aberration.

Incidentally, the control circuit 007 also has a function of driving a loading motor 013 to drive an access control circuit 010 and move the optical head 101 at a predetermined radial position.

As described above, by driving the circuits of the optical disk device 001, the host 014 can acquire the desired reproduction information.

Now, assume that a command to record information to the optical disk is input from the host 014 to the control circuit 007. An operation similar to the reproduction is performed to correct the spherical aberration for tracking, and the light source 102 is turned on to radiate and converge the light beam on the optical disk.

Next, a recording information is input from the host 014 to a recording information signal conversion circuit 006 through the control circuit 007 and converted into the recording signal by the recording information signal conversion circuit 006. This recording signal is sent to the control circuit 007. The control circuit 007 drives a light source control circuit 009 to control the light quantity of the light source thereby to record the recording signal to the optical disk. Incidentally, by use of the front monitor, the light quantity of the light source can be accurately monitored from the optical head 101. In the process, the control circuit 007 drives an access control circuit 010 and the spindle motor drive circuit 011, so that the access of the optical head 101 and the rotation of the optical disk are controlled in accordance with the recording signal.

By driving the circuits of the optical disk device 001 as described above, the recording information received from the host can be recorded to the optical disk.

According to this invention, the disturbances due to the unrequired light beam and the unrequired reflected light beam are avoided, and therefore, the operation is stabilized.

[Eighth embodiment]

Figure 12:
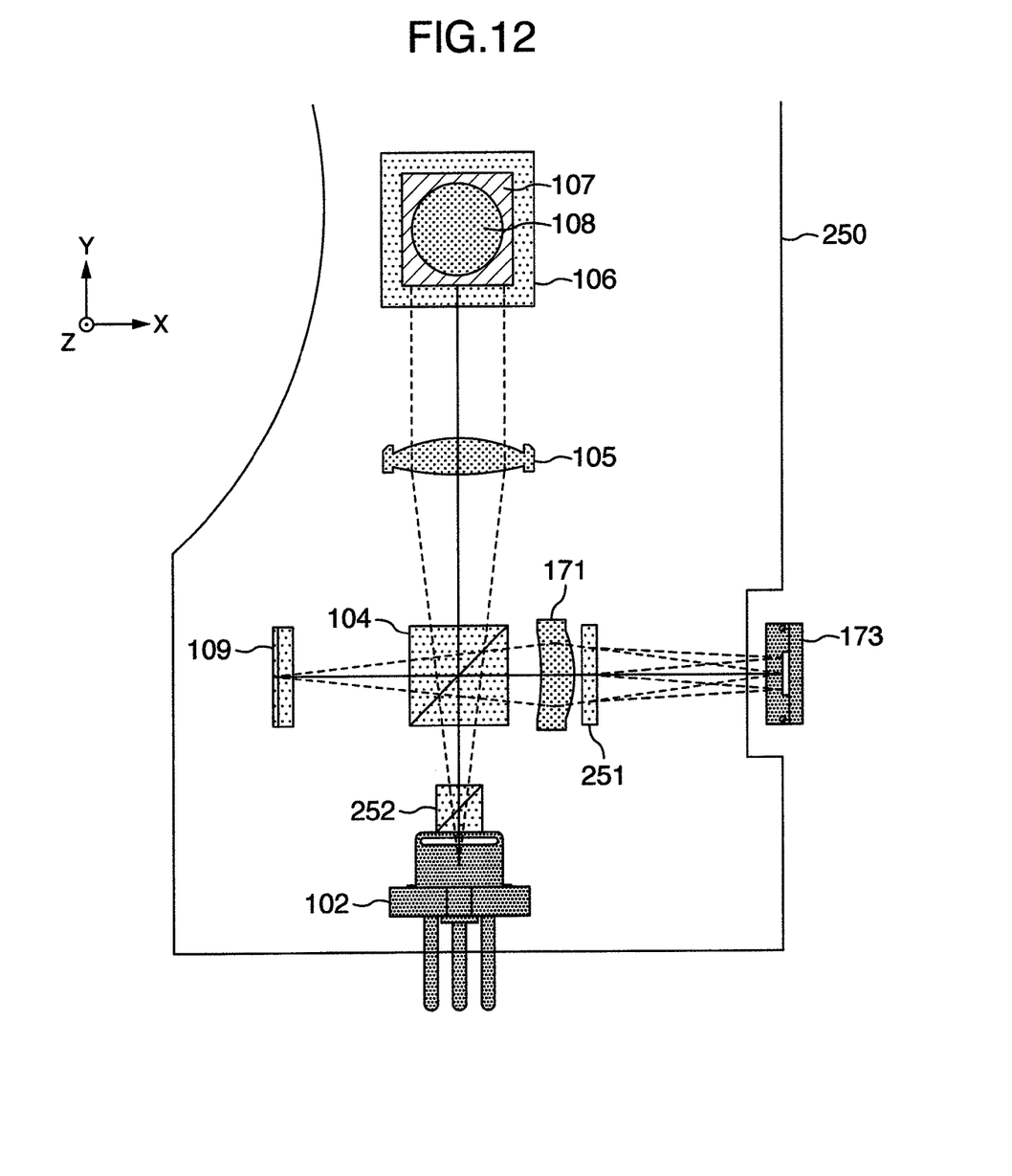
FIG. 12 is a diagram showing a general configuration of the optical head 250 according to an eighth embodiment.

An eighth embodiment of the invention is explained in detail with reference to the drawings. A modification of the optical head 170 shown in FIG. 7 is explained as an example. FIG. 12 shows the optical part arrangement of an optical head 250. In the optical head 250, unlike in FIG. 7, a polarization prism 252 is arranged and a regional diffraction grating 251 different from the regional diffracting grating 172 is arranged. The diffraction grating having the polarization characteristic is an expensive unit, so that, the regional diffraction grating 251 having no polarization characteristic is used.

In the case where the regional diffraction grating 251 is used, as in the fifth embodiment, the function of separating the unrequired light beam is lost. Therefore, the polarization prism 252 is arranged. The unrequired light beam can be separated by the polarization prism 252 in the manner described above. Also, since no light beam proceeds to the detection surface n of the detector 173, the detection surface n is not required. The detector having no detection surface n can of course be used. As described above, a stable information signal without the unrequired light beam separated by the polarization prism 252 can be obtained also by use of the regional diffraction grating 251 having not polarization characteristic. Also, the cost can be reduced by using the regional diffraction grating having no polarization characteristic.

The optical pickup and the optical disk device having the optical pick according to embodiments of the invention have been explained above. This invention, however, is not limited to these embodiments and can be variously improved or modified without departing from the spirit and scope of the invention.

The invention claimed is:

1. An optical head comprising:
a light-emitting element for emitting a light beam;
a first polarized light diverging element wherein among all the light beams emitted from said light-emitting element, the light beam of a first polarization direction is transmitted, and the light beam of a second polarization direction orthogonal to the first polarization direction is reflected in a direction different from said optical axis of the light beam of the first polarization direction;
a second polarized light diverging element for transmitting or reflecting the light beam of the first polarization direction that has been transmitted through said first polarized light diverging element;
a converging element for converging, on an information recording medium, the light beam transmitted through or reflected on said second polarized light diverging element;
a reflection element for reflecting the reflected light beam reflected on said information recording medium and reflected on or transmitted through said second polarized light diverging element; and
a detection element for detecting the reflected light beam reflected on said reflection element and transmitted through or reflected on said second polarized light diverging element;
wherein said information recording medium includes a plurality of information layers; and
wherein said reflection element includes a separation means for separating the reflected light beam reflected on a predetermined information layer of said information recording medium from the unrequired reflected light beam reflected on a different information layer from said predetermined information layer.

2. The optical head according to claim 1,
wherein said first polarized light diverging element is arranged between the light-emitting means and the second polarized light diverging element.

3. The optical head according to claim 1,
wherein the light beam transmitted through said first polarized light diverging element proceeds through said second polarized light diverging element and said converging element in that order;
wherein the reflected light beam proceeds through said converging element, said second polarized light diverging element and said reflection element in that order; and
wherein the reflected light beam proceeds through said reflection element, said second polarized light diverging element and said detection element in that order.

4. The optical head according to claim 1,
wherein the light beam emitted from said light-emitting element and entering said first polarized light diverging element, and the light beam emitted from said first polarized light diverging element and entering said second polarized light diverging element, are both the diverged light.

5. The optical head according to claim 1,
wherein said second polarized light diverging element transmits the light beam of said first polarization direction and reflects the light beam of said second polarization direction in a direction substantially orthogonal to the light beam of said first polarization direction.

6. The optical head according to claim 1, further comprising a shield wall for preventing entrance of the light beam of the second polarization direction into the detection element after being reflected on said first polarized light diverging element.

7. The optical head according to claim 1,
wherein said second polarized light diverging element is arranged between said first polarized light diverging element and said detection element.

8. The optical head according to claim 1, further comprising a light receiving element for receiving the light beam of said second polarization direction reflected on said first polarized light diverging element and monitoring the light quantity of the light beam.

9. The optical head according to claim 8,
wherein said light receiving element and said detection element are accommodated in a single housing.

10. The optical head according to claim 1,
wherein said first and second polarized light diverging elements constitute polarization prisms.

11. The optical head according to claim 1,
wherein said first polarized light diverging element is a polarized light diffraction grating and said second polarized light diverging element is a polarization prism.

12. The optical head according to claim 11,
wherein said detection element has a region for detecting the light beam diffracted by said polarized light diffraction element, in a region different from the detection element for detecting said second reflected light beam.

* * * * *